United States Patent [19]

Estes

[11] 4,053,938
[45] Oct. 11, 1977

[54] TEMPERATURE SENSING TRANSFORMER PRIMARY SWITCH

[75] Inventor: Michael J. Estes, Waukesha, Wis.

[73] Assignee: RTE Corporation, Waukesha, Wis.

[21] Appl. No.: 568,655

[22] Filed: Apr. 16, 1975

[51] Int. Cl.² ............................................ H02H 7/04
[52] U.S. Cl. .................... 361/37; 200/83 R; 337/2; 337/396
[58] Field of Search ............... 337/114, 115, 117, 306, 337/307, 308, 320, 321, 118, 128, 396, 2; 200/83; 317/14 C, 14 F, 14 G, 14 H, 14 J, 15; 323/62; 336/68, 192; 165/100; 236/100

[56] References Cited

U.S. PATENT DOCUMENTS

| | | | |
|---|---|---|---|
| 1,670,697 | 5/1928 | Treanor | 317/15 |
| 2,156,461 | 5/1939 | Rittenhouse | 317/15 |
| 2,268,229 | 12/1941 | Walle | 317/14 H |
| 2,306,728 | 12/1942 | Heddaeus | 337/118 |
| 2,714,143 | 7/1955 | Whitman et al. | 337/320 X |
| 2,750,472 | 6/1956 | Strange | 337/396 |
| 2,892,591 | 6/1959 | Matthews | 337/2 |
| 3,131,269 | 4/1964 | Asakawa | 236/100 |
| 3,169,180 | 2/1965 | Chafer | 337/128 |

Primary Examiner—Harold Broome
Attorney, Agent, or Firm—Ronald E. Barry

[57] ABSTRACT

A temperature sensing transformer primary switch for a distribution transformer, the switch being mounted within the distribution transformer below the level of the dielectric fluid and being manually operable externally of the transformer for opening the primary circuit and deenergizing the transformer, the switch including a temperature sensing device mounted on the internal end of the transformer below the level of the dielectric fluid to open the primary switch in response to overload temperatures produced on the transformer's secondary circuit. The temperature sensing device includes a compression spring and a wax motor for releasing the energy stored in the compression spring as the temperature of the dielectric fluid reaches a predetermined maximum temperature. The spring is preloaded sufficiently by a manual operation to actuate the switch at the maximum temperature. A pressure responsive switch assembly is provided for opening the primary switch.

23 Claims, 12 Drawing Figures

TEMPERATURE SENSING TRANSFORMER PRIMARY SWITCH

BACKGROUND OF THE INVENTION

In distribution transformers it has been the general practice to include a secondary circuit breaker or a load sensing fuse to deenergize the transformer secondary when the secondary winding is subject to overload conditions. The secondary breaker must be fairly large because of the currents encountered in the secondary circuit and as a result adds significantly to the cost of the transformer. Load sensing fuses are conventionally one shot devices which require replacement on fusing as well as producing a substantial increase in the temperature of the dielectric fluid.

SUMMARY OF THE INVENTION

The temperature sensing transformer primary switch of the present invention is connected in the primary circuit of the transformer and is immersed within the dielectric fluid within the transformer to open the primary circuit when the temperature of the dielectric fluid exceeds the maximum safe operating temperature of the distribution transformer. The primary switch is of the type described in U.S. application Ser. No. 415,937, filed on Nov. 15, 1973 and entitled "Self-Protected Distribution Transformer" now abandoned and refiled as application Ser. No. 598,988 and is connected in the primary circuit to allow for the manual opening of the primary circuit externally of the transformer. A temperature sensing assembly is mounted on the internal end of the primary switch and is immersed in the dielectric fluid to sense the temperature of the fluid and open the primary switch under fault or overload conditions. The temperature sensing device includes a wax motor which has an operating temperature band of 10° F. or less. The wax motor provides a linear response at the preset temperature band. This linear response is of sufficient force to actuate the primary switch either directly or by preloading a spring at the predetermined maximum operating temperature of the transformer. The switch can also be connected to respond to a predetermined pressure in the transformer casing.

DESCRIPTION OF THE INVENTION

Figure 1:
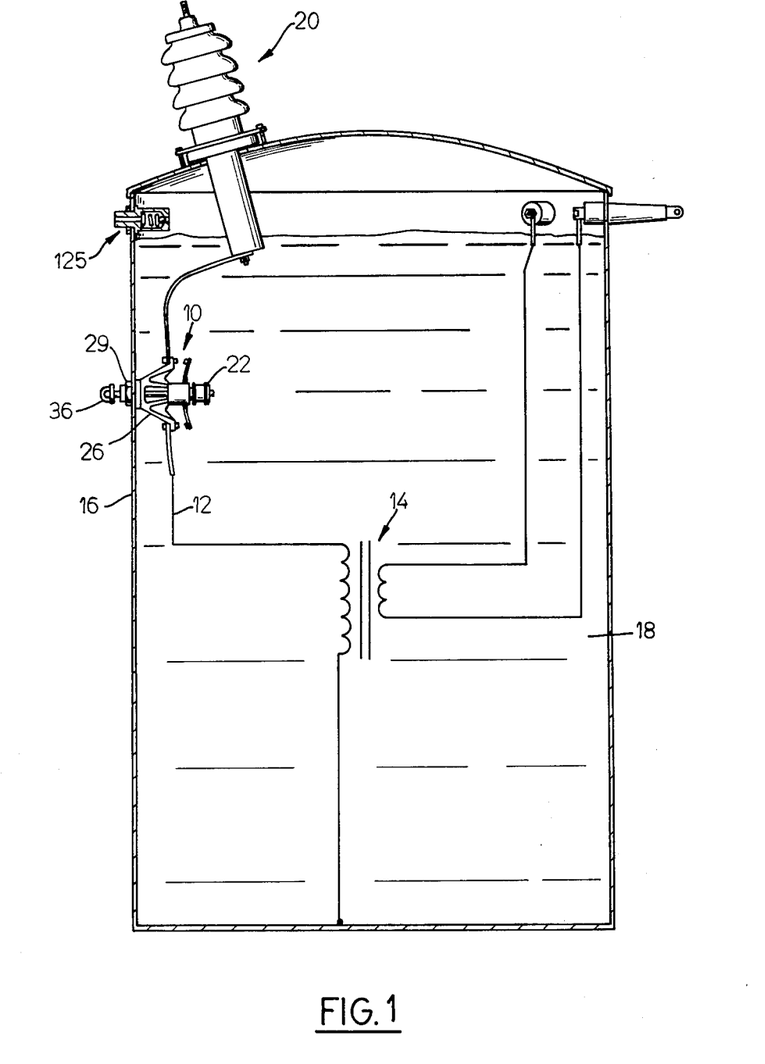
FIG. 1 is a schematic view of the temperature sensing transformer primary switch shown connected in the primary circuit of a distribution transformer.
Figure 8:
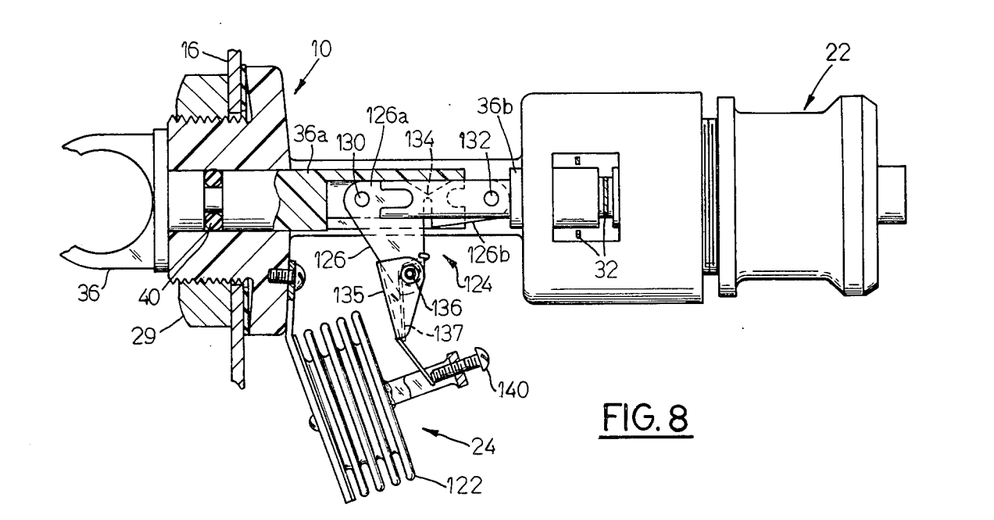
FIG. 8 is a view of a temperature sensing primary switch including a pressure responsive assembly shown partly in section and connected to operate the primary switch in response to an increase in pressure in the transformer.
Figure 9:
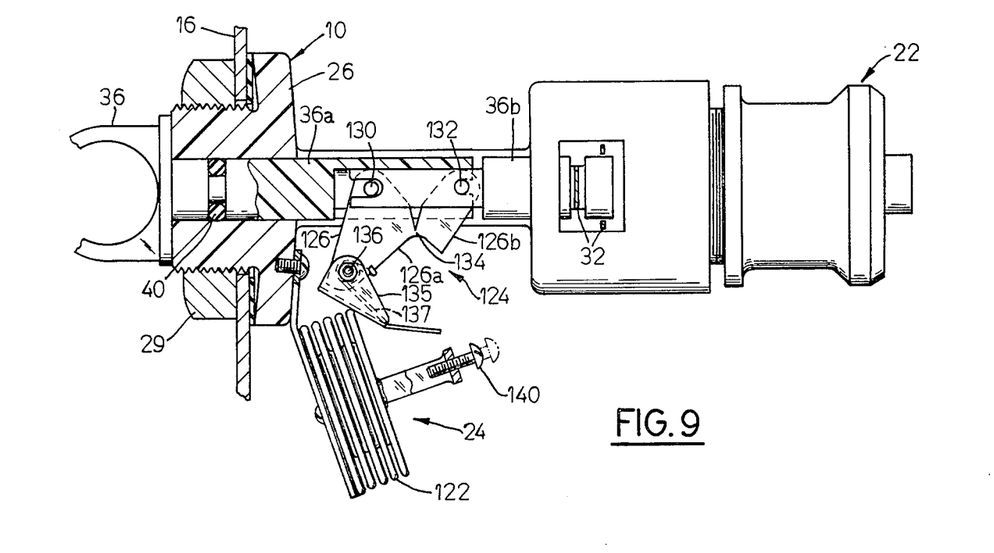
FIG. 9 is a view similar to FIG. 8 showing the pressure responsive assembly in the operative position.

The temperature sensing transformer primary switch 10 of the present invention, as shown in FIG. 1, is connected in the primary circuit 12 of a distribution transformer 14. The distribution transformer 14 is schematically shown positioned in a sealed casing 16 and immersed within a dielectric fluid 18 within the casing 16. The primary winding of the transformer 14 is connected through the switch 10 to a fused bushing 20 by means of the circuit 12 as is generally understood and as more fully described in copending application Ser. No. 415,937. The switch 10 can be used for manually opening the primary circuit 12 externally of the casing 16 or the switch 10 can be opened by means of a temperature sensing assembly 22 (FIGS. 2–7 and 11) mounted on the primary switch 10 or by means of a pressure responsive assembly 24 (FIGS. 8 and 9).

Generally, the primary switch 10 includes a body 26 which is retained in an opening 28 in the wall of the casing 16 by a nut 29 and sealed therein by a gasket 30. An overcenter snap switch blade 32 is mounted on the internal end of the body 26 and is movable into and out of contact with electrical contacts 34 to complete the primary circuit 12. The overcenter switch blade 32 is manually actuated by means of an operating rod 36 that extends outwardly through an opening 38 in the body 26 so that it is manually operable externally of the casing 16. The operating rod 36 is sealed within the opening 38 by O-ring seals 40 and is connected directly to the overcenter snap switch blade 32. An internally threaded opening 42 is provided on the internal end of the body 26.

THE TEMPERATURE SENSING ASSEMBLY

The temperature sensing assembly 22, as shown in FIGS. 2–7, includes a temperature responsive actuator in the form of a wax motor 44 which is commercially available and generally operates at the melting temperature of a quantity of wax 46 sealed within a cylinder 48 in the wax motor. More particularly, the wax motor 44 can be designed to respond to a very narrow temperature band. This band can be predetermined by proper selection of the motivating wax 46 to correspond to the maximum safe operating temperature of the distribution transformer 14. At the required temperature the wax 46 will melt and expand producing a force that can be transferred to the primary switch 10 to open the primary circuit 12 when the temperature of the dielectric fluid 18 approaches the safe maximum operating temperature of the transformer.

The expansion force of the melting wax is converted to a linear force by means of a rubber plug 50 positioned in the cylinder 48 of the wax motor and an output rod 52 that is connected to the rubber plug 50. The rod 52 will move axially outwardly from the wax motor with considerable force to either actuate the operating rod 36 directly or the force can be converted to an actuating force by means of a spring 54.

As seen in the drawing, the temperature sensing assembly 22 includes a housing 58 having a central bore 59, a catch ledge 60 intermediate the ends of the bore and a counterbore 62 at one end of the bore. The wax motor 44 is supported in the counterbore 62 by means of a retainer ring 64 having a central opening 66. The retainer ring 64 is seated in the counterbore 62 by means of a bead 68 provided on the outer circumference of the retainer ring which is seated in a groove 70 in the counterbore 62.

Figures 2, 2A, 3:
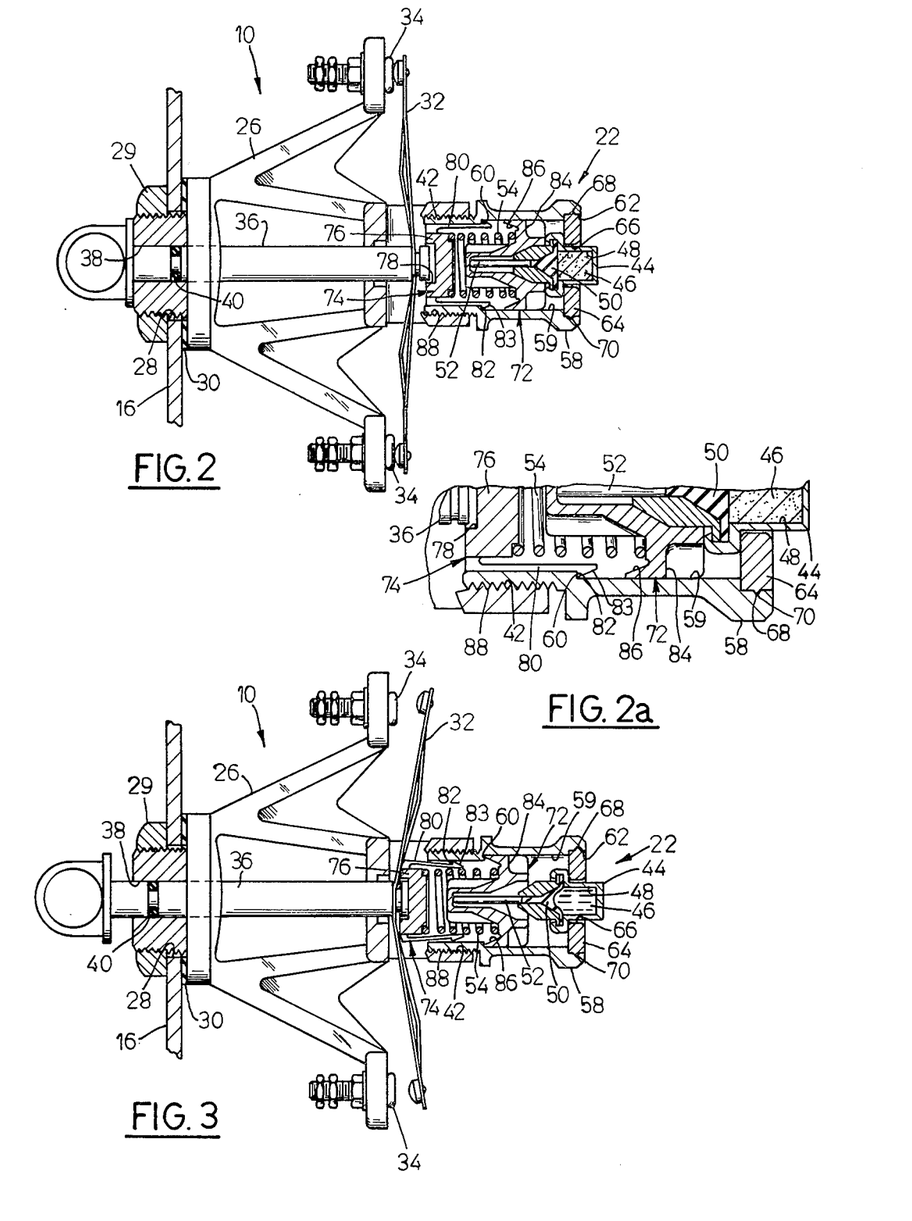
FIG. 2 is a view partially in section showing the temperature sensing device on the primary switch with the switch in the closed position.
FIG. 2a is an enlarged view of a portion of FIG. 2.
FIG. 3 is a view similar to FIG. 2 showing the temperature sensing device in the actuated position and the primary switch open.

Referring to FIGS. 2 and 3, a snap release type assembly 22 is shown for transferring the force of the output rod 52 of the wax motor to a fast actuating force for opening the primary switch 10. The snap release assembly 22 includes means for engaging the ledge 60 in the form of a catch release plug 74, and means for releasing the catch plug 74 from the ledge 60 in the form of an actuating plunger 72. The spring 54 is located between the plunger 72 and the plug 74.

The catch plug 74 includes a center section 76 having a recess 78 in one face and a cylindrical section 80 on the outer periphery of the section 76. The cylindrical section 80 is segmented and includes a catch 82 on the outer edge to engage the catch ledge 60 and a beveled edge 83. Segmenting of the cylindrical section 80 allows the segmented sections to bend slightly to release the catch 82 from the ledge 60. In this regard, the catch plug 74 is positioned in the end of the bore 59 with the recess 78 aligned with the end of the operating rod 36. The spring 54 is seated on the inner end of the plug 74 and on the surface of the actuating plunger 72.

The actuating plunger 72 includes a hollow cylindrical center section 85 and a radially extending flange 84. A camming ridge 86 is provided on the outer periphery of the flange 84 in a position to engage the beveled edge 83 of the cylindrical section 80. The output rod 52 of the wax motor is seated within the cylindrical center section 85 of the plunger 72 so that the axial movement of the rod 52 will move the plunger 72 toward the plug 74 compressing the spring 54. When the plunger has moved far enough for the camming ridge 86 to engage the beveled edge 83 of the cylindrical section 80, the segments of the cylindrical section will be cammed inwardly to release the catch 82 from the ledge 60. At this point, the force of the compressed spring 54 will be sufficient to overcome the bias of the switch blade 32 to produce a snap opening of the primary switch 10.

The temperature sensing assembly 22 is mounted on the end of the primary switch by means of a threaded section 88 which is threadedly received in the threaded opening 42 of the switch. The end of the operating rod 36 will be seated in the recess 78 in the plug 74. When the wax motor 44 is heated sufficiently to melt the wax 46, the output rod 52 of the wax motor will move outward pushing the actuating plunger 72 toward the catch plug 74 building up a bias force in spring 54 behind the catch plug 74. When the cam surface 86 engages the segmented sections of the cylindrical section 80, the catch plug 74 will be released from the ledge 60 and the force of the compressed spring 54 will open the primary switch 10.

Figure 4:
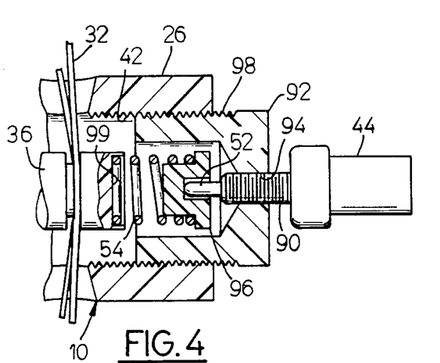
FIG. 4 is a partial view in section of an alternate form of the temperature sensing device for actuating the primary switch.

FIG. 4

In the embodiment of the invention shown in FIG. 4, means are provided for transferring the output force of the wax motor 44 to the operating rod 36 of the primary switch 10 at the force required to open the primary switch blade 32. In this embodiment, the wax motor 44 is provided with a threaded section 90 and is supported in the threaded opening 42 of the primary switch by means of a cylindrical member 92. The cylindrical member 92 is provided with a threaded opening 94 into which the threaded section 90 of the wax motor is threaded and a threaded section 98 for mounting the member in the threaded opening 42. The transferring means includes a spring 54 and and a spring retainer plug 96. The spring 54 is seated in a recess 99 provided in the end of the operating rod. When the wax motor 44 is heated to a temperature sufficient to melt the wax, the output rod 52 will move toward the operating rod 36 of the switch compressing the spring 54. As soon as the force of the compressed spring equals the force of the primary switch blade 32, the switch blade 32 will snap over opening the primary circuit 12.

Figure 5:
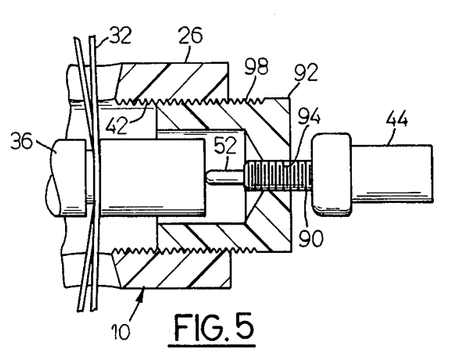
FIG. 5 is a partial view in section of a second alternate form of the temperature sensing device for opening the primary switch.

FIG. 5

In the embodiment of the invention shown in FIG. 5, the temperature sensing assembly 22 includes a wax motor 44 which is used to open the primary switch by the direct application of the linear motion of the output rod 52 to the operating rod 36 of the switch. The wax motor 44 is mounted in the threaded opening 94 of a cylindrical member 92. The cylindrical member 92 is mounted on the switch body 26 by means of the threaded section 98 on the outer surface which is threaded into the threaded opening 42 far enough for the rod 52 to engage the end of the operating rod 36. The output movement of the rod 52 will push the operating rod 36 far enough for the switch blade 32 to be moved overcenter to open the primary switch.

Figure 6:
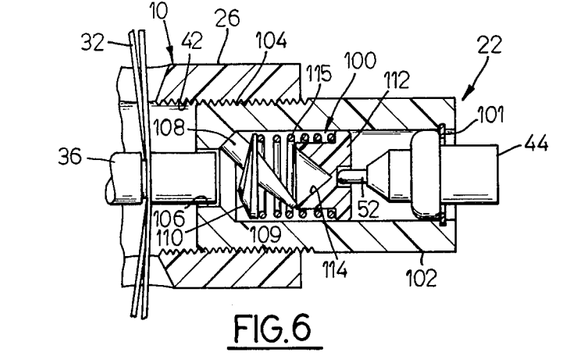
FIG. 6 is a partial view in section of another form of actuating mechanism for the temperature sensing device.
Figure 7:
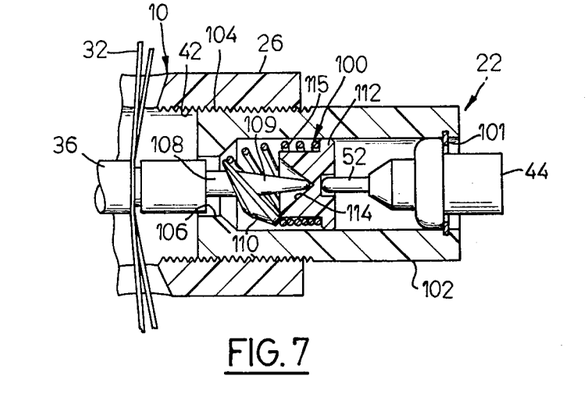
FIG. 7 is a view similar to FIG. 6 showing the wax motor and actuating device in the operative position.

FIGS. 6 and 7

In the embodiment of the invention shown in FIGS. 6 and 7, the temperature sensing assembly 22 includes a wax motor 44 and an actuating means in the form of a spring actuated center punch assembly 100. The motion of the rod 52 of the wax motor 44 is transferred to the operating rod 36 of the primary switch 10 by means of the overcenter punch assembly 100 to produce substantially instantaneous switch action. The assembly 22 includes a hollow cylindrical housing 102 having a threaded section 104 which is threadedly received within the threaded section 42 of the primary switch. An opening 106 is provided at the inner end of the housing 102 to receive the end of the operating rod 36. The wax motor 44 is retained within the housing 102 by means of a snap ring 101.

The center punch assembly 100 includes a center punch 108 having a tapered end 109 and a spring reaction ring 110 mounted on its outer surface. The center punch 108 is normally biased in an offset position within the housing 102 by a spring 115. The center punch 108 is rotated to the operating position by means of a cylindrical plunger 112 having a conical recess 114 located in one end to engage a tapered end 109 of the center punch 108. The spring 115 provided between the plunger 112 and the reaction ring 110 will snap the center punch 108 against the end of the operating rod 36.

When the wax motor 44 is actuated, the linear motion of the rod 52 of the wax motor will move the plunger 112 toward the center punch 108. The tapered end 109 of the center punch will be engaged by the conical recess 114 camming the center punch 108 into axial alignment with the operating rod 36. At the same time, the spring 115 is compressed to build up the bias force behind the spring reaction ring 110. When the center punch 108 is pivoted far enough to be in axial alignment with the opening 106, the center punch 108 will be forced by the bias of the spring 115 into engagement with the operating rod 36. The force of the center punch striking the end of the operating rod 36 will provide an instantaneous opening of the switch 10.

Figure 10:
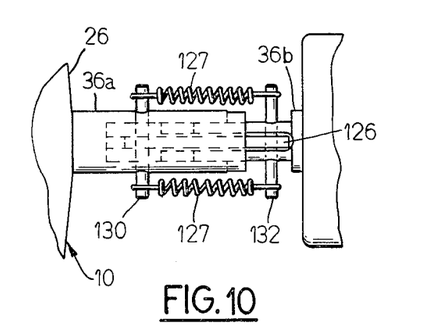
FIG. 10 is a view taken on line 10—10 of FIG. 8 showing the spring arrangement for the pressure responsive actuating device.

FIGS. 8, 9 and 10

Normally, pressure build up in a transformer casing is reduced by means of a pressure relief valve 125. However, when the pressure builds up to a pressure exceeding the strength of the casing 16 or at a rate faster than can be handled by the relief valve 125, an explosive condition will be present. Means are therefore provided for opening the primary circuit under a high pressure condition. Such means is in the form of the pressure responsive assembly 24.

In FIGS. 8, 9 and 10, the transformer primary switch 10 is shown with the pressure responsive assembly 24 connected to a split operating rod 36a, 36b to open the primary switch in response to an increase in pressure within the transformer casing. The pressure responsive assembly 24 includes bellows 122 mounted on the body of the primary switch and a linkage assembly 124 connecting the operating rod sections 36a and 36b. The bellows will respond to an increase in pressure to move the linkage assembly far enough to allow the linkage assembly to collapse. The operating rod sections 36a and 36b will be telescoped by means of the bias of a pair of springs 127 to open the primary switch blade 32.

The linkage assembly 124 includes a plastic hinge member 126 having one section 126a secured to section 36a of the operating rod by means of a pin 130 and the other section 126b secured to the operating rod section 36b by means of a pin 132. The two sections of the plastic hinge member 126 are connected by means of a flexible section 134 which is formed as an integral part of the plastic hinge. The section 126a of the plastic member is connected to the bellows 122 by means of a rocker arm 135 which is pivotally connected to section 126a by a screw 136.

When pressure builds up within the transformer casing at a rate in excess of the capacity of the relief valve 125, the bellows will collapse moving the rocker arm 135 to the left and pivoting the section 126a about the pin 130. As soon as the flexible sections are moved overcenter, the plastic hinge member 126 will collapse allowing the primary switch to move to an open position. The plastic hinge member 126 also allows for the manual actuation of the primary switch without affecting the position of the bellows. It should be noted that the rocker arm is positioned in a gap between a set screw 140 and the face of the bellows. When the operating rod 36 is moved manually, the rocker arm 135 is free to pivot on section 126a as seen in FIG. 9. The rocker arm 135 is biased toward an operating position by means of a spring 137.

Figure 11:
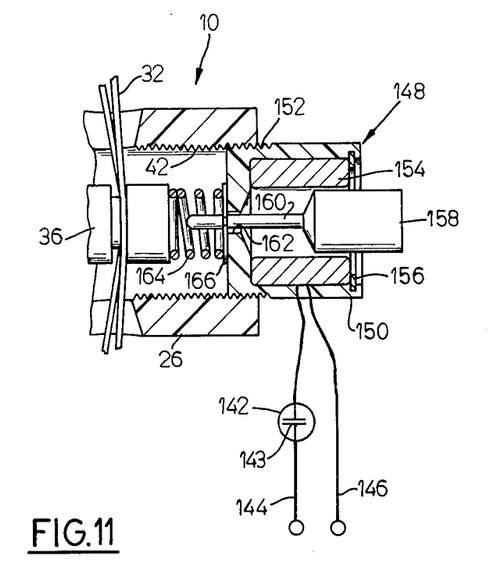
FIG. 11 is a view of a third form of temperature sensing arrangement for actuating the primary switch.

FIG. 11

In the embodiment of the invention shown in FIG. 11, the primary switch blade 32 is opened by means of a condition responsive switch 142. The switch 142 can be made to respond to any of a number of conditions such as temperature, pressure, oil level, etc.

The switch shown in FIG. 11 includes bimetal contacts 143 which are temperature responsive. The bimetal contacts 143 are connected across the secondary of the transformer by means of lines 144 and 146. The operating rod 36 of the primary switch is actuated by means of a solenoid 148 connected in series with the contacts 143.

The solenoid 148 includes a housing 150 having a threaded section 152 that is threadedly received in the opening 42 in the primary switch housing. A coil 154 is positioned within the housing and retained therein by a retainer ring 156. A core or armature 158 is positioned for reciprocal motion within the coil 154 and includes a rod 160 that extends axially outwardly through an opening 162 in the housing 150 in a position to engage the end of the operating rod 36. When the temperature of the dielectric fluid exceeds the safe maximum operating temperature of the transformer, the switch 142 will close the circuit to the solenoid 148 causing the core 158 to move toward the operating rod 36 far enough for the rod 160 to engage the operating rod and open the primary switch.

The core 158 is returned to its initial position by means of a spring 164 positioned between the end of the operating rod 36 and a spring plate 166 mounted on the rod 160. Opening of the primary switch de-energizes the transformer removing the power source for the coil 154; hence, the core 158 will be returned to its initial position by means of a spring 164 positioned between the end of the operating rod 36 and a spring plate 166 affixed to the rod 160. When the temperature of the dielectric fluid drops below the safe maximum operating temperature, the contacts 143 will open and the primary switch may then be reset.

It should be apparent that in each of the embodiments which have been described above, the primary switch is reset manually. This is accomplished by merely pushing the operating rod 36 inward to close the primary switch blade 32 with the contacts 34, or in the case of the pressure actuated version, by pulling the operating rod to the open position and then pushing inward.

Although the primary switch has been described in connection with a temperature sensing assembly and a pressure sensing assembly, other condition responsive assemblies could be used. In this regard an oil level switch can be used to sense the dielectric fluid level to open the primary switch.

I claim:

1. A temperature sensing assembly for opening a distribution transformer snap action type primary switch when the temperature of the fluid in the transformer exceeds the maximum safe operating temperature of the transformer, said assembly comprising:
    a housing mounted on the primary switch below the level of the dielectric fluid in the transformer,
    a temperature responsive actuator positioned in said housing, said actuator being responsive to the maximum safe operating temperature of the transformer,
    and bias means positioned between said actuator and switch whereby the motion of said actuator will compress the bias means and open the primary switch when the compressive force in the bias means is sufficient to actuate the primary switch.

2. The assembly according to claim 1 wherein said actuator comprises a wax motor.

3. The assembly according to claim 1 including means for manually resetting the primary switch.

4. The assembly according to claim 1 wherein said bias means includes a compression spring, whereby said spring will be compressed until the bias force of said spring is sufficient to actuate the primary switch.

5. The assembly according to claim 1 wherein said housing includes a catch ledge and further including means in said housing for engaging said ledge and being positioned to open said switch, means in said housing positioned for movement with said engaging means for releasing said engaging means from said ledge, and said bias means being located between said engaging means and said releasing means, whereby said releasing means will release the engaging means at the maximum safe operating temperature of the transformer and said biasing means will open said switch.

6. The assembly according to claim 5 wherein said engaging means includes a plug, said release means includes a plunger, and said transferring means includes a compression spring positioned between said plunger and said plug whereby said spring is compressed on movement of said plunger toward said plug to provide a bias force sufficient to open the primary switch when the plunger releases the plug from the ledge in the housing.

7. In a fluid insulated distribution transformer, a primary switch connected in series with the primary winding of the transformer and being immersed in the transformer dielectric fluid, said primary switch including a switch body, an overcenter snap switch blade mounted on said body and an operating rod for manually opening and closing said switch blade externally of said transformer, and a temperature sensing assembly responsive to the safe operating temperature of said transformer and immersed in said dielectric fluid, said temperature sensing assembly including a spring positioned to engage the operating rod and means responsive to the temperature of the dielectric fluid for compressing said spring until the spring bias force is sufficient to open said primary switch, whereby the primary winding is opened at the maximum safe operating temperature of the transformer.

8. The primary switch according to claim 7 wherein said temperature responsive means includes a wax motor mounted on said switch body and having an output rod positioned to engage the spring.

9. The primary switch according to claim 8 including release means between said spring and operating rod for releasing said spring when the bias force of the spring is sufficient to open the primary switch.

10. The primary switch according to claim 9 wherein said release means includes a catch plug on the end of said operating rod and a release plunger on the end of said output rod for releasing said catch plug on movement of said plunger toward said plug, said spring being located between said plug and said release plunger whereby said spring is compressed by the movement of said output rod toward said operating rod to provide a force sufficient to open the primary switch on release of said plug.

11. The primary switch according to claim 7 wherein said temperature responsive means includes a temperature responsive switch and electrically actuated means connected to said temperature responsive switch, said temperature responsive switch being activated at the maximum safe operating temperature of said transformer to energize said electrically actuated means and open said primary switch.

12. The primary switch according to claim 11 wherein said electrically actuated means comprises a solenoid having an armature positioned to engage said spring.

13. The primary switch according to claim 7 including a pressure responsive assembly for opening the primary switch at the maximum safe operating pressure of said transformer, said pressure responsive device being mounted on said primary switch and said operating rod including a collapsible linkage means connected to said pressure responsive assembly whereby said rod is collapsed at the safe operating pressure of said transformer to open the primary switch.

14. A pressure responsive assembly for opening a distribution transformer primary switch at the maximum safe operating pressure of the transformer, said assembly comprising a bellows mounted on the primary switch and an operating rod connected to said primary switch and including an overcenter linkage assembly connected to said bellows, bias means acting on said linkage assembly to open said primary switch on collapse of said linkage, said bellows being connected to collapse said linkage at the safe operating pressure.

15. The assembly according to claim 14 wherein said biasing means includes a pair of springs connected to bias said primary switch to an open position, said linkage assembly holding said primary switch in the closed position and allowing said switch to open on collapse of said linkage assembly.

16. The assembly according to claim 14 wherein said linkage assembly includes a hinge member operatively connected to the primary switch and a rocker arm connected to one end of said hinge member and extending into the path of motion of said bellows.

17. The assembly according to claim 16 wherein said hinge member includes first and second sections and a flexible section integral with and interconnecting said first and second sections whereby said hinge member will collapse on movement of said bellows in response to a pressure equal to the maximum safe operating pressure of the transformer.

18. In a fluid insulated distribution transformer, a primary switch connected in series with the primary winding of the transformer and being immersed in the transformer dielectric fluid, said primary switch including a switch body, an overcenter snap switch blade mounted on said body for movement between open and closed positions with respect to the primary switch contacts, and an operating rod for manually opening and closing said switch blade externally of said transformer, said operating rod including first and second sections, and a pressure responsive assembly connected to said first and second sections of said operating rod for opening said primary switch at the maximum safe operating pressure of said transformer, said pressure responsive assembly being mounted on the primary switch and linkage means interconnecting said operating rod sections for transferring the motion of said pressure responsive assembly to said primary switch, and means for biasing said operating rod sections toward each other to open said primary switch when said linkage means collapses.

19. The primary switch according to claim 18 wherein said linkage means includes a hinge member pivotally connected at each end to one of said primary switch operating rod sections and a rocker arm connected to said hinge member and extending into the path of motion of said pressure responsive assembly, said rocker arm being pivotable with respect to said hinge member to allow for manual operation of said primary switch without collapsing said hinge member.

20. The primary switch according to claim 19 wherein said hinge member includes a flexible section intermediate the ends thereof whereby said hinge member will collapse on movement of said pressure responsive assembly in response to a pressure equal to the maximum safe operating pressure of the transformer.

21. In a fluid insulated distribution transformer,
a primary switch connected in series with the primary winding of the transformer and being immersed in the transformer dielectric fluid, said primary switch including a switch body, an overcenter snap switch blade mounted on said body and an operating rod for manually actuating said switch blade, and a condition responsive assembly connected to said primary switch and mounted within said transformer, bias means connected between said operating rod and condition responsive assembly, said assembly including means responsive to a predetermined condition for moving said biasing means until sufficient force is available to open said primary switch, said condition responsive means being deenergized on opening of said primary switch whereby said switch blade cannot be reset until the predetermined condition is satisfied.

22. The primary switch according to claim 21 wherein said condition responsive means is responsive to the temperature of the dielectric fluid.

23. The primary switch according to claim 21 wherein said condition responsive means is responsive to the pressure in the transformer.

* * * * *

UNITED STATES PATENT OFFICE
CERTIFICATE OF CORRECTION

Patent No. 4,053,938  Dated October 11, 1977

Inventor(s) Michael J. Estes

It is certified that error appears in the above-identified patent and that said Letters Patent are hereby corrected as shown below:

Column 7, line 9, "engaging means" should read -- actuator --;

Column 7, lines 18 and 19, delete "transferring means includes a";

Column 7, line 19, after "spring" insert -- being --.

Column 8, line 8, "device" should read -- assembly --.

Signed and Sealed this

Sixteenth Day of May 1978

[SEAL]

Attest:

RUTH C. MASON
Attesting Officer

LUTRELLE F. PARKER
Acting Commissioner of Patents and Trademarks